(12) United States Patent
Yamada et al.

(10) Patent No.: US 7,437,927 B2
(45) Date of Patent: Oct. 21, 2008

(54) THERMAL TYPE GAS FLOW METER

(75) Inventors: Masamichi Yamada, Hitachinaka (JP);
Masahiro Matsumoto, Hitachi (JP);
Hiroshi Nakano, Hitachi (JP); Akio Yasukawa, Kashiwa (JP); Izumi Watanabe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/835,981

(22) Filed: Aug. 8, 2007

(65) Prior Publication Data
US 2008/0053215 A1    Mar. 6, 2008

(30) Foreign Application Priority Data
Aug. 31, 2006    (JP) .............................. 2006-234867

(51) Int. Cl.
*G01F 1/68* (2006.01)
(52) U.S. Cl. .................................. 73/204.21
(58) Field of Classification Search ............. 73/204.26, 73/204.21, 204.5
See application file for complete search history.

(56) References Cited

U.S. PATENT DOCUMENTS

| | | | | |
|---|---|---|---|---|
| 5,231,878 A | * | 8/1993 | Zanini-Fisher et al. | ... 73/204.26 |
| 5,804,720 A | * | 9/1998 | Morimasa et al. | ........ 73/204.26 |
| 6,176,131 B1 | * | 1/2001 | Hecht et al. | ............... 73/204.26 |
| 6,393,907 B1 | | 5/2002 | Yamakawa et al. | |
| 6,553,829 B1 | | 4/2003 | Nakada et al. | |

FOREIGN PATENT DOCUMENTS

JP    3545637 B2    10/2000

* cited by examiner

*Primary Examiner*—Jewel V Thompson
(74) *Attorney, Agent, or Firm*—Crowell & Moring LLP

(57) ABSTRACT

The invention provides a thermal type flow meter which has a high reliability and a low cost. In a thermal type flow meter provided with a flow rate detecting element in which at least a heat generating resistor and a lead electrode are formed on a surface of a tabular substrate, and a support body in which a concave portion accommodating the flow rate detecting element is formed on a surface, and in which the flow rate detecting element is firmly fixed and accommodated by an adhesive agent in a back surface of the tabular substrate and a part of a bottom surface of the concave portion, an approximately straight discharge groove which is deeper than a bottom surface of the concave portion and passes through both end surfaces in upward and downward sides of the concave portion is formed from the upstream side of the support body concave portion to the downstream side, between the cavity of the tabular substrate and the back surface region of the tabular substrate in which the lead electrode is formed. Accordingly, it is possible to achieve the thermal type flow meter which has the high reliability and the low cost.

15 Claims, 8 Drawing Sheets

CROSS SECTION ALONG A-A'

CROSS SECTION ALONG B-B'

CROSS SECTION ALONG C-C'

CROSS SECTION ALONG C-C'

THERMAL TYPE GAS FLOW METER

BACKGROUND OF THE INVENTION

1. Field of the Invention

The present invention relates to an apparatus for detecting a flow rate, and more particularly to a flow rate sensor of an internal combustion engine, a flow rate sensor used in a fuel battery system or the like.

2. Description of Related Art

Conventionally, as an air flow rate sensor provided in an intake air passage of an internal combustion engine of a motor vehicle or the like, and measuring an amount of an intake air, a thermal type sensor comes to a mainstream because the thermal type sensor can directly detect a mass air amount. Recently, since an air flow rate sensor particularly manufactured by a semiconductor micromachining technique has a high speed response and can detect a back flow by utilizing a speed of the response, such an air flow rate sensor has been remarked.

A technique of the conventional thermal type air flow rate sensor using the semiconductor substrate mentioned above is disclosed, for example, in patent document 1 (JP-B2-3545637).

In this conventional embodiment, a flow rate detecting element using a tabular semiconductor substrate is accommodated in a support body having a concave portion, and is arranged in such a manner as to be approximately in parallel to a flow direction of the air flow and in such a manner that a surface of the flow rate detecting element has a predetermined surface position with a surface of the support body.

The prior art has the following problems. FIG. 14 shows a support body accommodating a flow rate detecting element of a thermal type flow meter described in the patent document 1, and FIGS. 15 and 16 show a cross section along a line C-C' in FIG. 14 together with the flow rate detecting element.

A flow rate detecting element 1 is constituted by a diaphragm portion 56a and 56b formed on two cavities 17a and 17b in a tabular semiconductor substrate 1a. A heat generating resistor (not shown) for detecting a flow rate is formed in the diaphragm portion 56a, and a fluid temperature detecting resistor (not shown) for detecting a temperature of a measured fluid is formed in the diaphragm portion 56b, respectively.

The flow rate detecting element 1 is accommodated within a concave portion 3 formed in a support body 2. The concave portion 3 of the support body 2 has surfaces having three stages of heights. The highest surface is constituted by surfaces 53a, 53b and 20, forms a surface defining the flow rate detecting element 1, and makes the surface of the flow rate detecting element 1 and the surface of the support body 2 approximately at the same height by setting a step (a distance to the surface of the support body 2) of the surface to a predetermined value. The surfaces 53a and 53b support a back surface of a leading end portion of the flow rate detecting element 1, and the back surface of the flow rate detecting element 1 and the support body 2 are fixed by an adhesive agent (not shown) in the surface 20.

The second stage of surface 21 is provided for forming a gap between a diaphragm portion 56a in which a heat generating resistor for detecting the flow rate of the flow rate detecting element 1 is formed and the support body 2.

Further, the third stage of surface 55 forms a deepest surface, is coupled to notches 54a and 54b for flowing an air, and is positioned in a lower surface of a diaphragm 56b in which the fluid temperature detecting resistor is formed. In accordance with the structure mentioned above, since the air flows into the diaphragm 56b in which the fluid temperature detecting resistor is formed, from the notches 54a and 54b by the surface 55, the fluid temperature can be detected at a high speed and a high precision.

However, in accordance with the conventional support structure, since the support body is structured in the three stages, and is formed in a complicated shape, a cost is increased.

Further, since the gap between the flow rate detecting element 1 and the support body 2 is formed by the second stage of surface 21, a part of the measure air flow flows to the back surface of the flow rate detecting element 1 from the gap. Accordingly, the measured air flow flowing to an upper surface of the diaphragm portion 56a in which the heat generating resistor for detecting the flow rate is formed is reduced and a measuring precision is deteriorated. This tendency noticeably appears particularly in a high flow rate region.

Further, in the case of being provided in the inflow air passage of the internal combustion engine of the motor vehicle or the like, a wide variety of dust, oil, water content and the like contained in the intake air affect. Reference numeral 19 shown in FIG. 15 denotes the wide variety of dust, oil, water content and the like contained in the air. In the conventional support structure, the third stage of surface 55 constructs a back chamber of the notches 54a and 54b corresponding to inlet and outlet of the air, and this portion triggers a reserve of the dust, oil, water content and the like 19, whereby a reliability is deteriorated. Further, since the gap exists between the flow rate detecting element 1 and the support body 2 in the second stage of surface 21, the reserve of the dust, oil, water content and the like 19 is generated in this gap, whereby a reliability is deteriorated.

Further, in the case that a high flow rate of air flows to the lower surface of the diaphragm 56b in which the fluid temperature detecting resistor is formed, there is a high risk that the dust 19 directly hit the diaphragm 56b so as to destroy as shown in FIG. 16, and a problem exists in a reliability.

BRIEF SUMMARY OF THE INVENTION

Accordingly, an object of the present invention is to provide a thermal type flow meter which solves the problem in the prior art and has a high reliability and a low cost.

The object mentioned above can be solved by the invention described in claims.

For example, in accordance with the present invention, there is provided a thermal type flow meter comprising:

a flow rate detecting element in which at least a heat generating resistor and a lead electrode are formed on a surface of a tabular substrate, a cavity partly removes the tabular substrate existing in a lower portion of the heat generating resistor forming region so as to construct a flow rate detecting diaphragm, and the lead electrode is formed in an end portion side of the tabular substrate;

a support body in which a concave portion accommodating the flow rate detecting element is formed on a surface, and the surface is arranged approximately in parallel to a flow direction of a measured fluid; and the flow rate detecting element being firmly fixed and accommodated by an adhesive agent at least in a back surface of the tabular substrate of the region in which the lead electrode is formed, and a part of the concave portion, in such a manner that a surface of the flow rate detecting element comes to a predetermined surface position with respect to the surface of the support body, wherein an approximately straight discharge groove which is deeper than a bottom surface of the concave portion and passes through both end surfaces in upward and downward sides of the concave portion is formed from the upstream side of the support body concave portion to the downstream side, between the cavity of the tabular substrate and the back surface region of the tabular substrate in which the lead electrode is formed.

In accordance with the present invention, in the thermal type flow meter provided with the flow rate detecting element in which at least the heat generating resistor and the lead electrode are formed on the surface of the tabular substrate, the cavity partly removes the tabular substrate existing in the lower portion of the heat generating resistor forming region so as to construct a flow rate detecting diaphragm, and the lead electrode is formed in the end portion side of the tabular substrate, and the support body in which the concave portion accommodating the flow rate detecting element is formed on the surface, and the surface is arranged approximately in parallel to the flow direction of the measured fluid, and the flow rate detecting element being firmly fixed and accommodated by the adhesive agent at least in the back surface of the tabular substrate of the region in which the lead electrode is formed, and the part of the concave portion, in such a manner that the surface of the flow rate detecting element comes to the predetermined surface position with respect to the surface of the support body, since the approximately straight discharge groove which is deeper than the bottom surface of the concave portion and passes through both end surfaces in the upward and downward sides of the concave portion is formed from the upstream side of the support body concave portion to the downstream side, between the cavity of the tabular substrate and the back surface region of the tabular substrate in which the lead electrode is formed, it is possible to provide the thermal type flow meter having a high reliability and a low cost.

Other objects, features and advantages of the invention will become apparent from the following description of the embodiments of the invention taken in conjunction with the accompanying drawings.

DETAILED DESCRIPTION OF THE INVENTION

A description will be in detail given below of a thermal type gas flow meter in accordance with the present invention on the basis of an illustrated embodiment.

Figure 2:
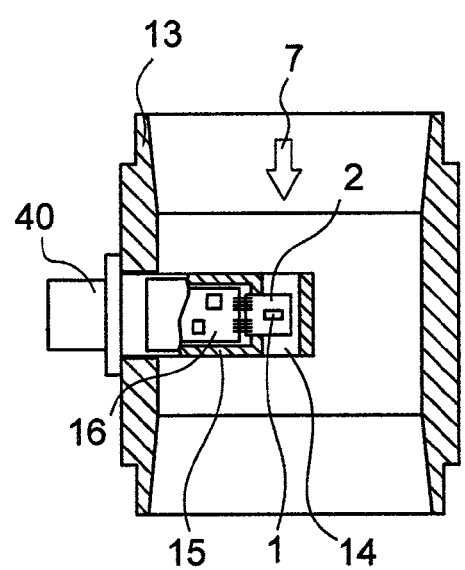
FIG. 2 is an explanatory view showing an example of a mounting state of the flow rate detecting element in the embodiment of the thermal type flow meter in accordance with the present invention.

FIG. 2 is a cross sectional view showing an embodiment in the case of mounting a thermal type flow meter 40, for example, to an intake passage 13 of an internal combustion ending of a motor vehicle. In this case, a flow rate detecting element 1 is internally capsulated in a support body 2, is further integrated with a casing 15 and an external circuit 16, and is arranged in an auxiliary passage 14 existing in an inner portion of the intake passage 13. The external circuit 16 is electrically connected to the flow rate detecting element 1 via the support body 2.

In this case, an intake air of the internal combustion engine normally flows in a direction shown by an arrow 7. A fuel injection amount of the internal combustion engine is controlled by measuring a flow rate of the intake air.

Figure 1:
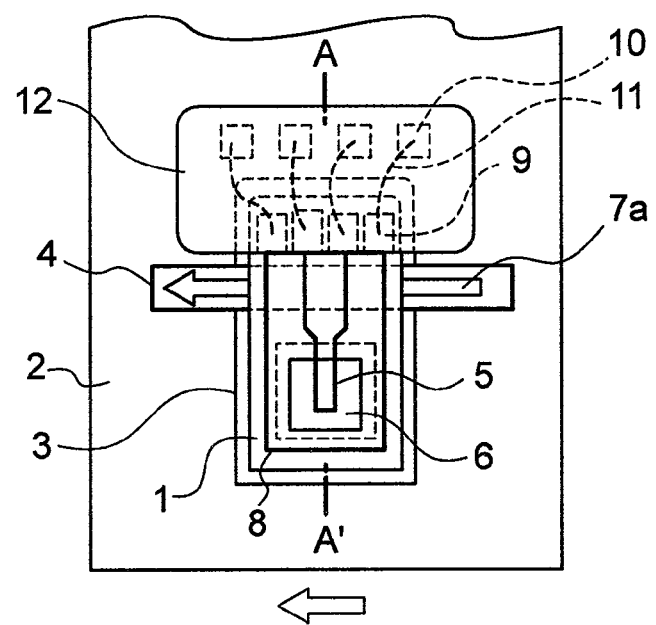
FIG. 1 is a plan view of a flow rate detecting element and a support body in an embodiment of a thermal type flow meter in accordance with the present invention.
Figure 3:
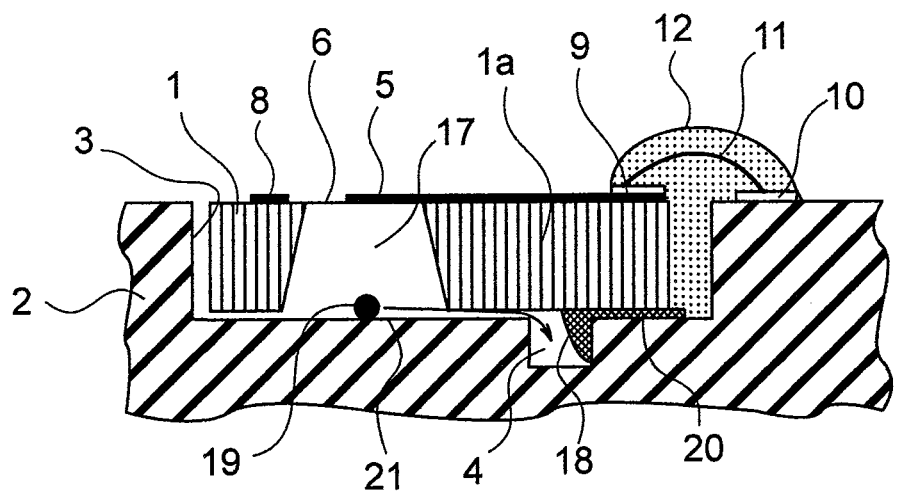
FIG. 3 is a cross sectional view of the flow rate detecting element and the support body in the embodiment of the thermal type flow meter in accordance with the present invention.
Figure 4:
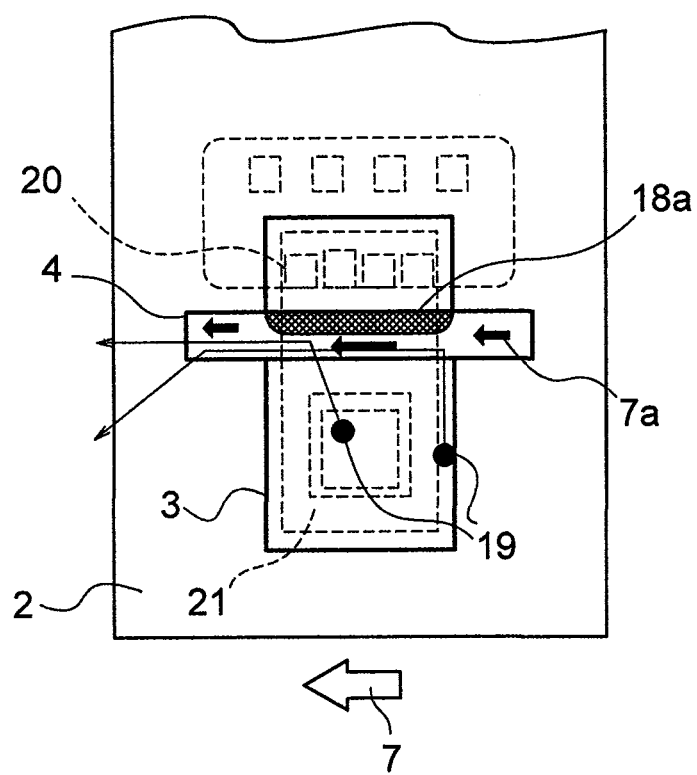
FIG. 4 is a plan view of the support body in the embodiment of the thermal type flow meter in accordance with the present invention.

FIG. 1 is a plan view of the flow rate detecting element 1 and the support body 2 of the thermal type flow meter 40 in accordance with the embodiment of the present invention, and a cross section along a line A-A' in FIG. 1 is shown in FIG. 3. Further, a detailed plan view of the support body 2 except the flow rate detecting element 1 in FIG. 1 is shown in FIG. 4.

The flow rate detecting element 1 is formed on the basis of a tabular semiconductor substrate 1a as a whole. The semiconductor substrate 1a corresponds to a single crystal silicon (Si) plate in which a cavity portion 17 is formed, and a diaphragm portion 6 is formed in an upper surface thereof. In this case, the cavity portion 17 is formed as a hole in which a plane shape is approximately rectangular.

The diaphragm portion 6 is structured such as to coat a whole surface of the semiconductor substrate including the cavity portion 17 by an insulating film, at least a heat generating resistor 5 is formed in the diaphragm portion 6, and a fluid temperature measuring resistor 8 measuring a temperature of a measured fluid 7, and a terminal electrode portion 9 for electrically connecting to an external circuit are formed on the semiconductor substrate around the diaphragm portion 6.

The heat generating resistor 5 and the fluid temperature measuring resistor 8 are formed as a narrow bar having a predetermined conductivity (resistance value), by a polycrystal or single-crystal silicon semiconductor thin film obtained by doping a phosphor (P) or a boron (B) at a high concentration or a metal thin film such as a platinum or the like.

Further, in the terminal electrode portion 9, a thin film pad of an aluminum (Al), a gold (Au) or the like is formed, after a through hole (not shown) is formed in the insulating film.

The flow rate detecting element 1 is accommodated within a concave portion 3 formed in the support body 2, and is firmly fixed to the support body 2 in a bottom surface 20 by an adhesive agent 18 in such a manner that the diaphragm portion 6 is arranged in a bottom portion 21 of the concave portion 3. Further, a discharge groove 4 is provided in a downstream side from an upstream side of the concave portion 3 so as to be deeper than the bottom surface of the concave portion and be approximately in a straight line penetrating both end surfaces in upstream and downstream sides of the concave portion.

A connection electrode portion 10 is formed in the support substrate 2, and is electrically connected to a terminal electrode portion 9 of the flow rate detecting element 1 mentioned above by a metal wire or the like 11 in accordance with a wire bonding. Further, a wiring pattern (not shown) for connecting to the external circuit 16 is inner packaged in the support substrate 2, and is electrically connected to the flow rate detecting element 1 mentioned above. Further, a sealing material 12 is formed for protecting the electrode portions 9 and 10, and the metal wire or the like 11.

As shown in FIG. 4, a fluid speed increasing means 18a is formed in the discharge groove 4 by an adhesive agent in a lower region of the flow rate detecting element 1. The fluid speed increasing means 18a may be formed by the adhesive agent or the sealing material 12.

In the embodiment in accordance with the present invention structured as mentioned above, since the diaphragm 56b in which the fluid temperature detecting resistor is formed in the prior art does not exist in the discharge groove 4, there is no risk that the dust 19 hits directly the diaphragm 56b so as to break down.

Further, since the back chamber does not exist in the third stage of surface 55 and the fluid speed increasing means 18a is formed in the discharge groove 4, as is different from the prior art, the speed of the air flow 7a flowing through the lower surface of the flow rate detecting element 1 is increased and the negative pressure is generated, whereby the reserve of the dust, the oil, the water content and the like 19 in the lower surface of the flow rate detecting element 1 is effectively sucked and discharged to the discharge groove 4.

Further, the gap between the flow rate detecting element 1 and the support body 2 is formed by the second stage of surface 21 in the prior art, however, the step corresponding to the surface 21 is not provided in the present embodiment. Accordingly, it is possible to reduce a part of the measured air flow flowing to the back surface of the flow rate detecting element 1 from the gap, and a measuring precision is improved.

Further, in the present embodiment, since the support body 2 is constituted by the two stage structure, and has the simple shape, and the fluid speed increasing means 18a is formed by the adhesive agent 18 and the sealing material 12, it is possible to achieve a low cost. Further, since the discharge groove 4 prevents the adhesive agent 18 and the sealing material 12 from flowing into the cavity 17 side (the surface 21) of the flow rate detecting element 1, a productivity is improved and a reliability is high.

If the adhesive agent 18 used in the present embodiment employs an epoxy resin, a silicone adhesive agent or the like in which a metal, for example, a silver (Ag) or the like is not mixed, it is possible to improve a sensor characteristic.

Generally, in the case of adhering a semiconductor chip to an alumina or the like, an adhesive agent in which the metal, for example, the silver (Ag) or the like is mixed is used as an adhesive agent having an improved thermal conduction, for releasing a heat on the semiconductor chip to the substrate side, however, a thermal resistance between the flow rate detecting element 1 and the support body 2 becomes smaller in the adhesive agent or the like in which the silver (Ag) is mixed, and a heat generation of the circuit substrate or the like is inversely transmitted to the flow rate detecting element 1 via the support body 2 so as to have an adverse effect on the characteristic.

Further, since the silver tends to be corroded by a corrosive gas, for example, a sulfur dioxide within the intake pipe, the epoxy resin, the silicon adhesive agent or the like in which the metal is not mixed is preferable in the light of a reliability.

As the sealing material 12 used in the present invention, an epoxy resin or a fluorocarbon resin is employed.

In the case of sealing by the epoxy resin, if a gas bubble stays in the epoxy resin, the connection wire 11 is corroded thereby, and a crack is generated thereby. Accordingly, it is ideal to execute a vacuum deaeration so as to inhibit the gas bubble from being generated.

Further, in order to make a thermal expansion coefficient of the epoxy resin close to the single crystal silicon (Si) substrate 1a, a low thermal expanding inorganic material such as a silica or the like is blended. Since the connection wire 11 is protected after forming the sealing material 12, a handling characteristic in a production step is improved, and it is possible to prevent a defect such as a disconnection of the connection wire 11 from being generated even if the sealing material 12 is touched in the manufacturing process.

The same effect as the epoxy resin mentioned above can be obtained in the case of using the fluorocarbon resin. Since the fluorocarbon resin is excellent in an environment resistance, particularly a swelling resistance against a non-polar solvent such as a gasoline, an engine oil or the like, the resin itself is soft in comparison with the epoxy resin, any stress is not applied to the connection wire 11. In this case, since the handling characteristic after forming the sealing material 12 becomes deteriorated in comparison with the epoxy resin mentioned above due to its softness, it is necessary to handle carefully.

Figure 10:
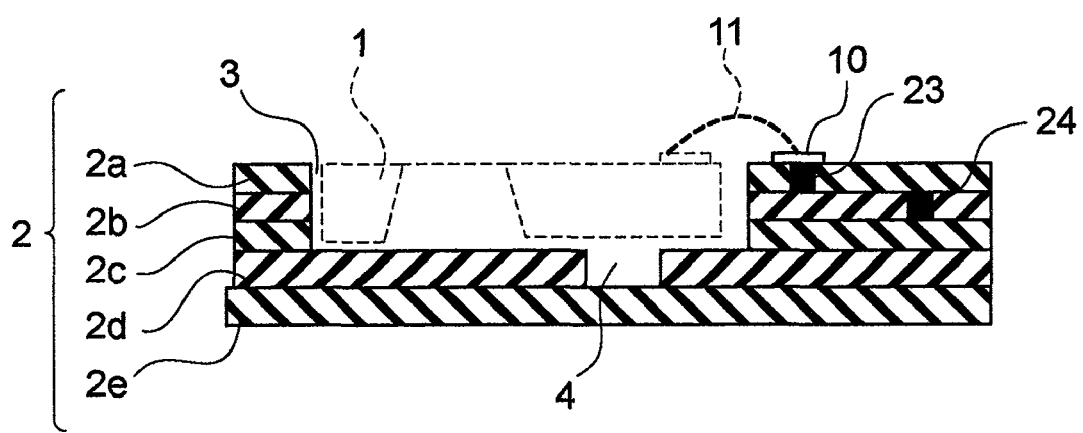
FIG. 10 is a cross sectional view of the support body in the embodiment of the thermal type flow meter in accordance with the present invention.

Further, as the support body 2 used in the present embodiment, there is shown the case of being formed by the resin, however, it is possible to use a ceramic multilayer substrate as shown in FIG. 10.

The support body 2 in FIG. 10 is formed as a five-layer laminated structure constituted by ceramic substrates 2a, 2b, 2c, 2d and 2e. Each of the ceramic substrates is in a green sheet state having a thickness between about 0.1 and 0.3 mm, and the respective layers are brought into close contact with each other so as to be pressurized and laminated. At this time, a predetermined hole is formed in the laminated substrates 2a, 2b, 2c and 2d in the upper layer in accordance with a punching mold or the like for structuring the concave portion 3 and the discharge groove 4. The predetermined ceramic multilayer substrate 2 is manufactured by baking them.

Since the green sheet made of the ceramic is contracted 10 to 30% in some baking condition, a laminating height of the green sheet is set somewhat higher while taking the contraction into consideration. The concave portion 3 and the discharge groove 4 obtained by the laminating means are characterized that it is possible to secure a flatness of the bottom, and are different from a structure rounded in a corner portion which can be obtained by the other forming method, for example, a press molding. Accordingly, it is possible to stably set the surface of the support body 2 and the surface of the flow rate detecting element 1 to a predetermined value at a time of arranging the flow rate detecting element 1 to the concave portion 3, and it is possible to achieve a reduction of a dispersion of an output characteristic.

As the material of the ceramic substrate, it is possible to employ a material such as an alumina, a complex material of the alumina and a glass, a zirconia, a silicon nitride, an aluminum nitride or the like. Particularly, taking a cost advantage into consideration, the alumina, or the complex material of the alumina and the glass is excellent. Further, the alumina is excellent in a strength, however, since the complex material of the alumina and the glass is advantageous in a thermal performance because the glass is blended and the heat conductivity is very small.

Further, the advantage of the ceramic multilayer substrate exists in a fact that a wiring pattern such as a print or the like can be formed on a front surface and a back surface of the laminated substrates 2a, 2b, 2c, 2d and 2e, as shown in FIG. 10. The connection electrode 10 and the wiring pattern 4 are mounted, and are connected to the wiring pattern 24 in each of the intermediate laminated substrates by a partly formed through hole 23. Since the other electric parts can be mounted on a top surface of the ceramic multilayer substrate, it is possible to integrally structure the external circuit 16 and the flow rate detecting element 1 so as to achieve a downsizing. Since it is possible to connect the flow rate detecting element 1 and the external circuit 16 to the housing 15 by one step, it is possible to achieve a cost reduction on the basis of a reduction of a working time.

Figure 5:
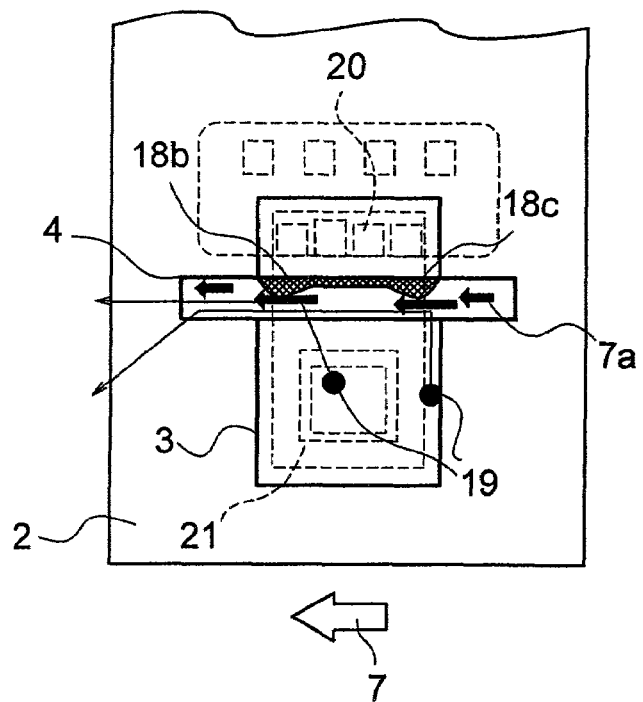
FIG. 5 is a plan view of the support body in the embodiment of the thermal type flow meter in accordance with the present invention.

Next, FIG. 5 shows a detailed plan view of the support body 2 in accordance with a second embodiment of the present invention.

The second embodiment is different from the first embodiment in FIG. 4 mentioned above in a point that the speed increasing means formed in the discharge groove 4 is constituted by speed increasing means 18b and 18c provided at two positions. The speed increasing means 18b and 18c are formed near both ends of the flow rate detecting element 1 by the adhesive agent 18 or the sealing material 12.

In accordance with the structure mentioned above, the speed of the air flow 7a flowing in the discharge groove 4 is increased near an inflow port and an outlet in both ends of the flow rate detecting element 1. A more negative pressure is generated near the inflow port and the outlet in both ends of the flow rate detecting element 1, and the reserve of the dust, the oil, the water content or the like 19 particularly staying between the end surface of the concave portion 3 and the flow rate detecting element 1 can be effectively sucked and discharged to the discharge groove 4. In the present embodiment, the speed increasing means are provided at two positions, however, the effect is not changed even by further adding the speed increasing means.

Figure 6:
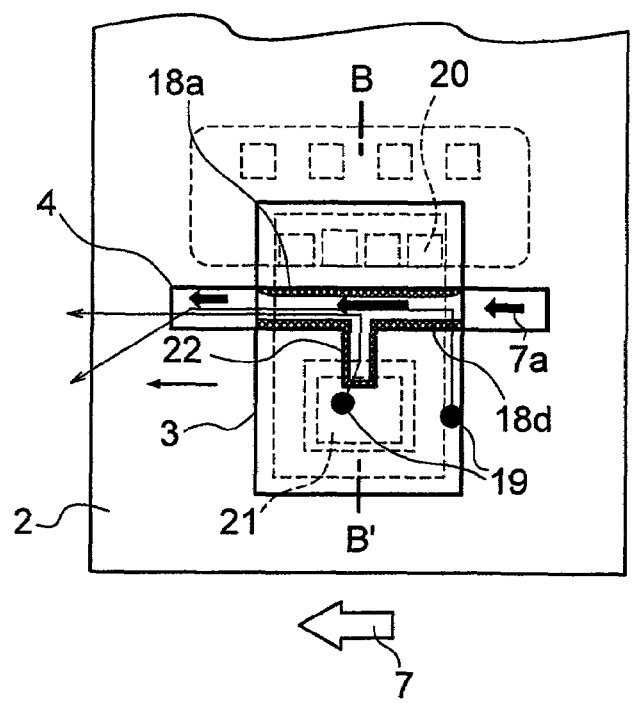
FIG. 6 is a plan view of the support body in the embodiment of the thermal type flow meter in accordance with the present invention.
Figure 7:
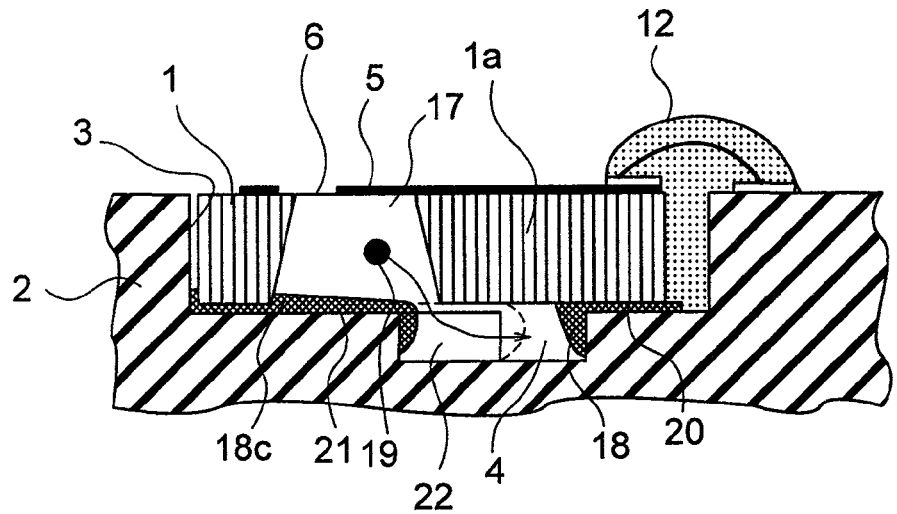
FIG. 7 is a cross sectional view of the flow rate detecting element and the support body in the embodiment of the thermal type flow meter in accordance with the present invention.

Next, FIG. 6 is a detailed plan view of the support body 2 in accordance with a third embodiment of the present invention, and FIG. 7 is a cross sectional view along a line B-B'.

The third embodiment is structured such that the discharge groove 4 is provided newly with a groove 22 communicating with the cavity 17 of the flow rate detecting element 1. Further, the flow rate detecting element 1 is adhered to a peripheral portion 21 of the cavity 17 in addition to the support body 2 and the surface 20, by the adhesive agent 18.

In accordance with the structure mentioned above, the peripheral portion of the cavity 17 of the flow rate detecting element 1 is sealed by the adhesive agent 18 except the groove 22. Since the gap is not provided between the flow rate detecting element 1 and the support body 2, it is possible to prevent a part of the measure air flow from flowing to the back surface of the flow rate detecting element 1 from the gap. Accordingly, the measuring precision is improved.

Further, since the groove 22 is communicated with the discharge groove 4 and the cavity 17, the cavity 17 comes to an equal pressure to an air pressure in the external portion even in the case that the air pressure in the external portion is rapidly changed. Accordingly, since any unnecessary pressure is not applied to the diaphragm portion 6, it is possible to prevent the diaphragm portion from being broken.

Further, since the speed increasing means 18d is formed in an opposing surface side in addition to the speed increasing means 18a in the discharge groove 4 by the adhesive agent 18, the reserve of the staying dust, oil, water content or the like 19 can be effectively sucked and discharged to the discharge groove 4.

Figure 8:
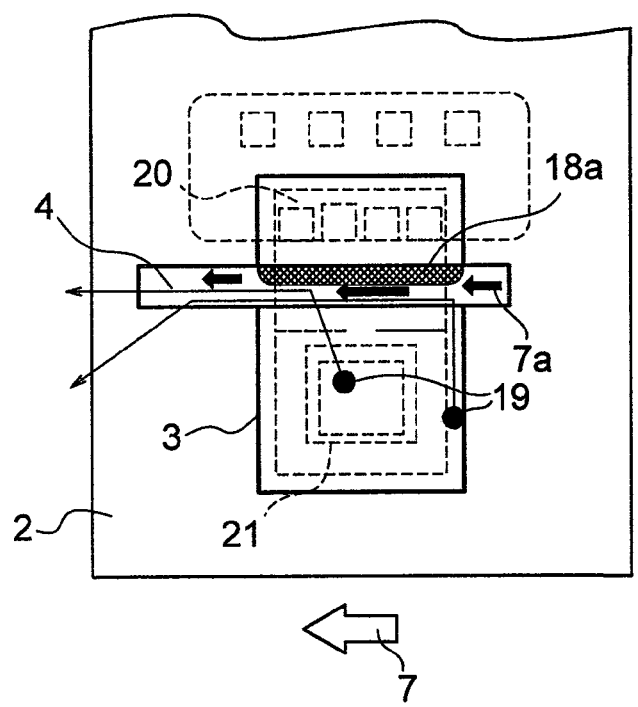
FIG. 8 is a plan view of the support body in the embodiment of the thermal type flow meter in accordance with the present invention.

Next, FIG. 8 shows a detailed plan view of the support body 2 in accordance with a fourth embodiment of the present invention.

The fourth embodiment is structured such that a length in an upstream side from the concave portion 3 of the support body of the discharge groove 4 is shorter than a length in a downstream side. In accordance with the structure mentioned above, an outlet in the downstream side of the discharge groove 4 becomes wider, whereby the effect of the negative pressure is further increased, so that the reserve of the staying dust, oil, water content or the like 19 can be effectively sucked and discharged to the discharge groove 4.

Figure 9:
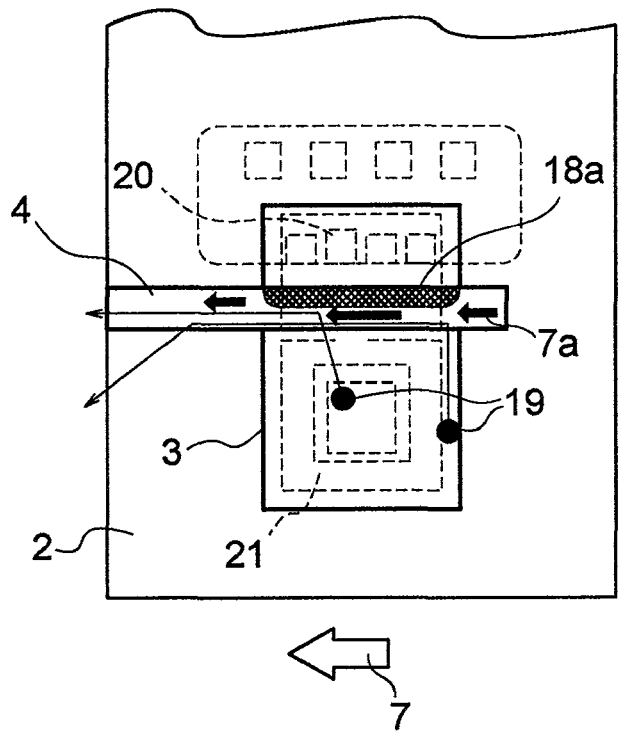
FIG. 9 is a plan view of the support body in the embodiment of the thermal type flow meter in accordance with the present invention.

FIG. 9 shows a detailed plan view of the support body 2 in accordance with a fifth embodiment of the present invention. The fifth embodiment is structured such that the downstream side outlet of the discharge groove 4 in the fourth embodiment in FIG. 8 is extended to the downstream end surface of the support body 2. In accordance with the structure mentioned above, since the liquid component of the oil, the water content or the like 19 flows down from the downstream side outlet of the discharge groove 4 even in the case that the flow speed of the air flows 7 and 7a is slow, the discharging effect becomes further higher.

Figure 11:
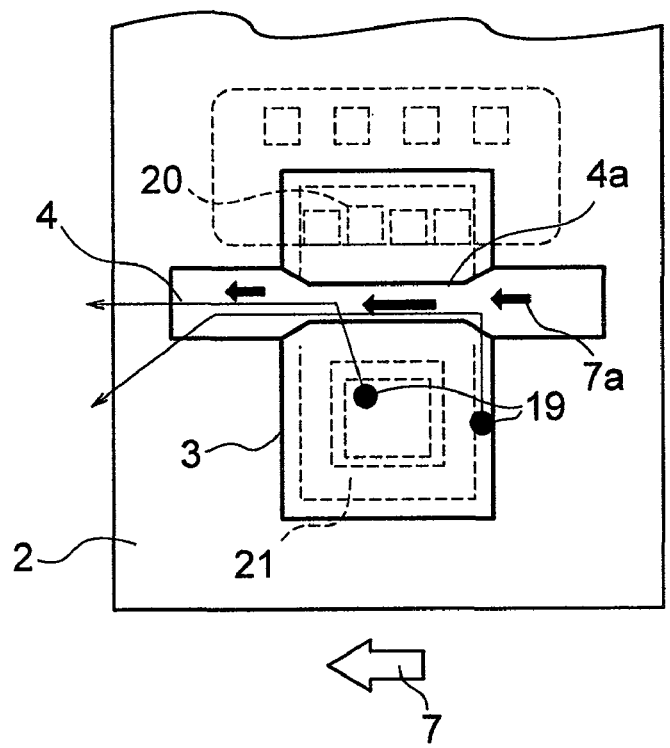
FIG. 11 is a plan view of the support body in the embodiment of the thermal type flow meter in accordance with the present invention.

FIG. 11 shows a detailed plan view of the support body 2 in accordance with a sixth embodiment of the present invention. The sixth embodiment is structured such that a groove width of the discharge groove 4 is narrowed as the speed increasing means 4a of the discharge groove 4. In accordance with the structure mentioned above, the effect of the negative pressure is further increased, and the reserve of the staying dust, oil, water content or the like 19 can be effectively sucked and discharged to the discharge groove 4.

Figure 12:
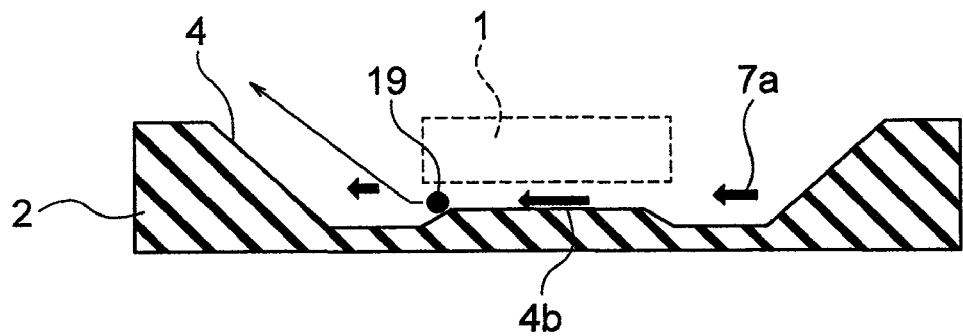
FIG. 12 is a cross sectional view of the support body in the embodiment of the thermal type flow meter in accordance with the present invention.

FIG. 12 shows a detailed plan view of the support body 2 in accordance with a seventh embodiment of the present invention. The seventh embodiment is structured such that a groove depth of the discharge groove 4 is narrowed as the speed increasing means 4b of the discharge groove 4. In accordance with the structure mentioned above, the effect of the negative pressure is further increased, and the reserve of the staying dust, oil, water content or the like 19 can be effectively sucked and discharged to the discharge groove 4.

As mentioned above, in accordance with the present invention, it is possible to provide the thermal type flow meter which can solve the problem in the prior art and has the high reliability and the low cost.

Figure 13:
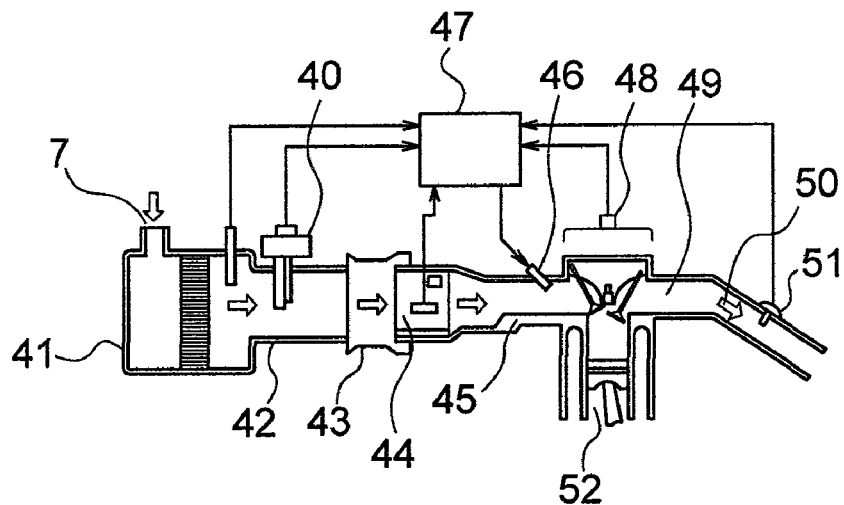
FIG. 13 is a system view of an internal combustion engine in accordance with the present invention.
Figure 14:
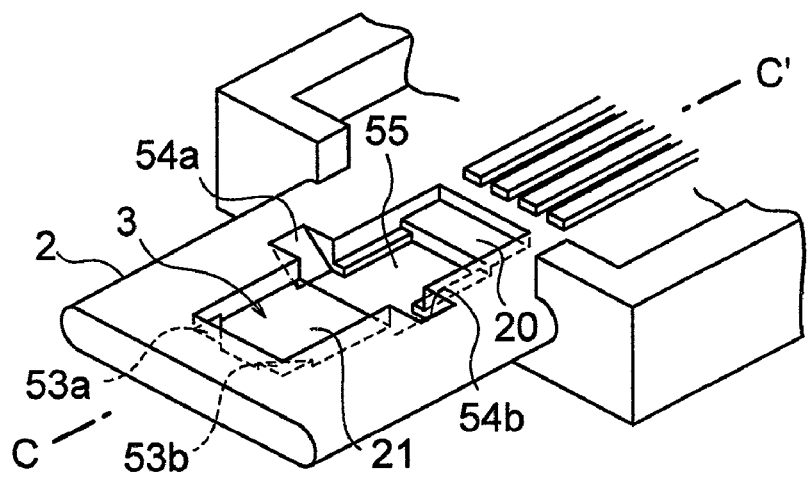
FIG. 14 is a plan view of a flow rate detecting element and a support body in accordance with a prior art.
Figure 15:
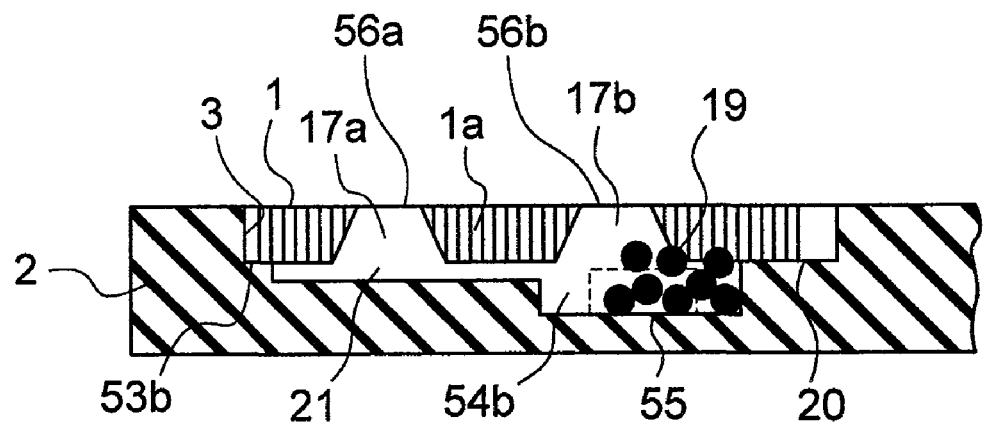
FIG. 15 is a cross sectional view of the flow rate detecting element and the support body in accordance with the prior art.
Figure 16:
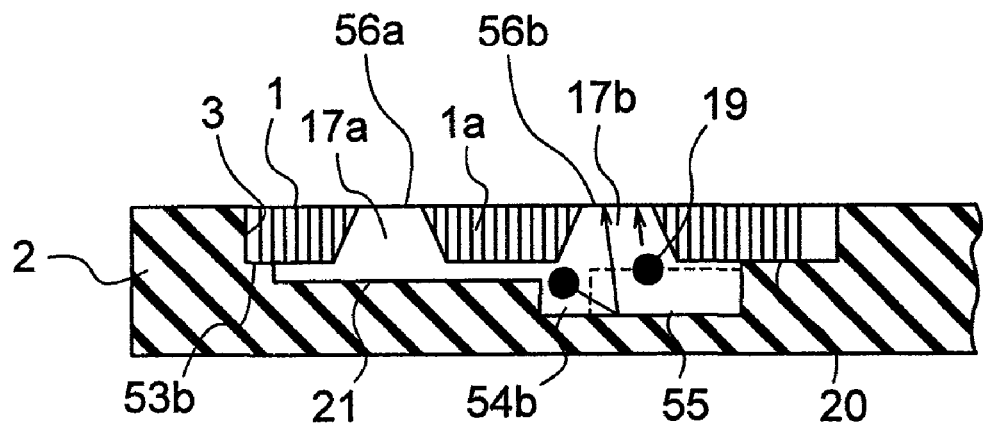
FIG. 16 is a cross sectional view of the flow rate detecting element and the support body in accordance with the prior art.

FIG. 13 shows an embodiment used in an internal combustion engine, particularly, in a gasoline engine.

The intake air 7 to the engine flows in an intake passage constituted by an air cleaner 41, a body 42, a duct 43, a throttle 45, a throttle body 44 and the like. In a partway passage or a bypass passage, the thermal type flow meter 40 to which the present invention is applied detects the flow rate of the intake air 7, and a flow rate signal is imported to a control unit 47 in a signal mode such as a voltage, a frequency or the like, and is used for controlling a combustion portion structure constituted by an injector 46, an ignition plug 48, an engine cylinder 52, an exhaust manifold 49, an exhaust gas 50 and an oxygen concentration meter 51 and a sub system.

In this case, a case of a diesel engine is approximately the same in a basic structure, and the present invention can be applied thereto. In other words, the structure is made such that a flow rate is detected by the thermal type flow meter 40 in accordance with the present invention arranged in a partway of an air cleaner and an intake manifold o the diesel engine, and the signal is imported to the control unit.

Further, by popular request such as an automobile emission control intention and an air pollution prevention recently, there are active researches of a propane gas vehicle, a natural gas vehicle, a motor vehicle driven by a motor while generating an electric power by using a fuel battery on the basis of a fuel using a hydrogen and an oxygen. The thermal type flow meter in accordance with the present invention can be applied to a system detecting the flow rate and property controlling a fuel supply amount.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A thermal type gas flow meter comprising:
   a semiconductor element in which a resistor generating heat by a current application is formed, and detecting a flow rate;
   a substrate in which a concave portion installing said semiconductor element therein is formed; and
   said semiconductor element and said concave portion being fixed by an adhesive agent,
   wherein a groove intersecting said concave portion from an upstream side of a gas to a downstream side is formed in said substrate, and
   wherein a part of said adhesive agent is formed so as to narrow down a cross section of said groove.

2. A thermal type gas flow meter as claimed in claim 1, wherein the thermal type gas flow meter is provided with a processing circuit processing a signal from said semiconductor element, and
   wherein the adhesion between said semiconductor element and said concave portion by said adhesive agent is executed only in a side closer to said processing circuit than said groove.

3. A thermal type gas flow meter as claimed in claim 1, wherein the thermal type gas flow meter is provided with an auxiliary passage having a bent portion, and
   wherein said semiconductor element is installed within said auxiliary passage in a downstream side than said bent portion.

4. A thermal type gas flow meter comprising:
   a flow rate detecting element in which at least a heat generating resistor and a lead electrode are formed on a surface of a tabular substrate, a cavity partly removes said tabular substrate existing in a lower portion of said heat generating resistor forming region so as to construct a flow rate detecting diaphragm, and said lead electrode is formed in an end portion side of said tabular substrate;
   a support body in which a concave portion accommodating said flow rate detecting element is formed on a surface, and said surface is arranged approximately in parallel to a flow direction of a measured fluid; and
   said flow rate detecting element being firmly fixed and accommodated by an adhesive agent at least in a back surface of the tabular substrate of the region in which said lead electrode is formed, and a part of said concave portion, in such a manner that a surface of said flow rate detecting element comes to a predetermined surface position with respect to the surface of said support body,
   wherein an approximately straight discharge groove which is deeper than a bottom surface of said concave portion and passes through both end surfaces in upward and downward sides of said concave portion is formed from the upstream side of said support body concave portion to the downstream side, between the cavity of said tabular substrate and the back surface region of the tabular substrate in which the lead electrode is formed.

5. A thermal type gas flow meter as claimed in claim 4, wherein said discharge groove has at least a fluid speed increasing means in a lower surface region of said tabular substrate.

6. A thermal type gas flow meter as claimed in claim 5, wherein said fluid speed increasing means is formed by an adhesive agent for adhering a back surface of the tabular substrate and a part of a bottom surface of said concave portion.

7. A thermal type gas flow meter as claimed in claim 5, wherein said fluid speed increasing means is formed by a sealing material formed in an upper portion of a lead electrode for protecting the lead electrode of the tabular substrate.

8. A thermal type gas flow meter as claimed in claim 5, wherein said fluid speed increasing means is formed by narrowing a part of a groove width of said discharge groove.

9. A thermal type gas flow meter as claimed in claim 5, wherein said fluid speed increasing means is formed by making a part of a groove depth of said discharge groove shallow.

10. A thermal type gas flow meter as claimed in claim 4, wherein a length in a side closer to an upstream side than said support body concave portion of said discharge groove is longer than a length in a side closer to a downstream side than said support body concave portion.

11. A thermal type gas flow meter as claimed in claim 4, wherein said discharge groove has a groove communicating with a cavity of said tabular substrate in a lower surface region of said tabular substrate.

12. A thermal type gas flow meter as claimed in claim 11, wherein a back surface of the tabular substrate and a bottom surface of said support body concave portion are firmly fixed by an adhesive agent in the periphery of the cavity of said tabular substrate.

13. A thermal type gas flow meter as claimed in claim 4, wherein said support body is constituted by a laminated substrate obtained by laminating and baking substrates of a ceramic material and forming said concave portion, the discharge groove and the like.

14. An engine system comprising:
    an engine;
    the thermal type gas flow meter as claimed in claim 1 attached to an intake pipe of said engine;
    a fuel supply means supplying a fuel to said engine; and a control means controlling said fuel supply means on the basis of an output of said thermal type gas flow meter.

15. An engine system comprising:
    an engine;
    the thermal type gas flow meter as claimed in claim 4 attached to an intake pipe of said engine;
    a fuel supply means supplying a fuel to said engine; and a control means controlling said fuel supply means on the basis of an output of said thermal type gas flow meter.

* * * * *